(12) United States Patent
Klingspor et al.

(10) Patent No.: US 11,070,083 B2
(45) Date of Patent: Jul. 20, 2021

(54) INDUCTIVE POWER TRANSFER UNIT, A SYSTEM FOR INDUCTIVE POWER TRANSFER AND A METHOD OF COMMUNICATING

(71) Applicant: Bombardier Primove GmbH, Berlin (DE)

(72) Inventors: Alexander Klingspor, Karlsruhe (DE); Simon Wechsler, Mannheim (DE); Uwe Reinersmann, Muenster (DE); Robert Czainski, Doluje (PL)

(73) Assignee: Bombardier Primove GmbH, Berlin (DE)

( * ) Notice: Subject to any disclaimer, the term of this patent is extended or adjusted under 35 U.S.C. 154(b) by 339 days.

(21) Appl. No.: 15/768,296

(22) PCT Filed: Oct. 17, 2016

(86) PCT No.: PCT/EP2016/074889
§ 371 (c)(1),
(2) Date: Apr. 13, 2018

(87) PCT Pub. No.: WO2017/064326
PCT Pub. Date: Apr. 20, 2017

(65) Prior Publication Data
US 2018/0309323 A1  Oct. 25, 2018

(30) Foreign Application Priority Data
Oct. 16, 2015 (GB) .................... 1518313

(51) Int. Cl.
*H02J 50/10* (2016.01)
*H01F 38/14* (2006.01)
*H01Q 7/06* (2006.01)
*H02J 50/90* (2016.01)
*H04B 5/00* (2006.01)
(Continued)

(52) U.S. Cl.
CPC ............. *H02J 50/10* (2016.02); *H01F 27/28* (2013.01); *H01F 38/14* (2013.01); *H01Q 1/248* (2013.01);
(Continued)

(58) Field of Classification Search
CPC . H02J 50/10; H02J 50/90; H02J 7/025; H01F 38/14; H01Q 7/06; H04B 5/0037; H04B 5/0075
See application file for complete search history.

(56) References Cited

U.S. PATENT DOCUMENTS 7,454,170 B2    11/2008  Goossens et al.
7,508,350 B2 *   3/2009  Hein .................. B82Y 25/00
                                            343/787
(Continued)

FOREIGN PATENT DOCUMENTS

DE    102011014752 A1    9/2012
DE    202013100528 U1    6/2014
(Continued)

OTHER PUBLICATIONS

Harney, Wireless Triangulation Using RSSI Signals. 2009.

*Primary Examiner* — Daniel Kessie
(74) *Attorney, Agent, or Firm* — The Webb Law Firm

(57) ABSTRACT

The invention relates to an inductive power transfer unit, wherein the inductive power transfer unit includes at least one winding structure and at least one flux guiding means, wherein the inductive power transfer unit further includes at least one antenna element, wherein at least one portion of the at least one flux guiding means is a part of the antenna element. The invention further relates to a system for inductive power transfer and a method of communicating.

17 Claims, 3 Drawing Sheets

(51) Int. Cl.
*H01Q 1/24* (2006.01)
*H02J 50/40* (2016.01)
*H02J 50/12* (2016.01)
*H01F 27/28* (2006.01)
*H02J 7/02* (2016.01)

(52) U.S. Cl.
CPC ............... *H01Q 7/06* (2013.01); *H02J 50/12* (2016.02); *H02J 50/40* (2016.02); *H02J 50/90* (2016.02); *H04B 5/0037* (2013.01); *H04B 5/0075* (2013.01); *H01F 2038/143* (2013.01); *H02J 7/025* (2013.01)

(56) References Cited

U.S. PATENT DOCUMENTS

| | | | |
|---|---|---|---|
| 9,431,834 B2 * | 8/2016 | Keeling | ................. H02J 7/025 |
| 9,866,036 B2 | 1/2018 | Asaoka et al. | |
| 2015/0151641 A1 | 6/2015 | Berger et al. | |
| 2016/0297314 A1 * | 10/2016 | Iwai | ........................ B60L 53/39 |
| 2017/0018947 A1 * | 1/2017 | Chien | ..................... H02J 50/10 |
| 2017/0033606 A1 * | 2/2017 | Maikawa | ................. H02J 50/10 |
| 2017/0080815 A1 * | 3/2017 | Wechsler | ............... B60L 53/38 |

FOREIGN PATENT DOCUMENTS

| | | |
|---|---|---|
| DE | 102013101152 A1 | 8/2014 |
| GB | 2522852 A | 8/2015 |
| JP | 11122146 | 4/1999 |
| JP | 200842761 A | 2/2008 |
| WO | 2011127455 A2 | 10/2011 |
| WO | 2012095896 A1 | 7/2012 |
| WO | 2014023595 A2 | 2/2014 |
| WO | 2014156145 A1 | 10/2014 |

* cited by examiner

INDUCTIVE POWER TRANSFER UNIT, A SYSTEM FOR INDUCTIVE POWER TRANSFER AND A METHOD OF COMMUNICATING

CROSS-REFERENCE TO RELATED APPLICATIONS

This application is the United States national phase of International Application No. PCT/EP2016/074889 filed Oct. 17, 2016, and claims priority to United Kingdom Patent Application No. 1518313.0 filed Oct. 16, 2015, the disclosures of which are hereby incorporated in their entirety by reference.

BACKGROUND OF THE INVENTION

Field of the Invention

The invention relates to an inductive power transfer unit of a system for inductive power transfer, a system for inductive power transfer and a method of communicating between a primary unit and a secondary unit of such an inductive power transfer system.

Description of Related Art

Electric vehicles, in particular a track-bound vehicle, and/or a road automobile, can be operated by electric energy which is transferred by means of an inductive power transfer. Such a vehicle may comprise a so-called receiving device adapted to receive an alternating electromagnetic field and to produce an alternating electric current by electromagnetic induction. Such a receiving device can comprise or provide a so-called secondary winding structure. Furthermore, such a vehicle can comprise a rectifier adapted to convert an alternating current (AC) to a direct current (DC). The DC can be used to charge a traction battery or to operate an electric machine. The rectifier converts the AC provided by the receiving device into the DC.

The inductive power transfer is usually performed using a primary unit which generates the alternating electromagnetic field by a primary winding structure and a secondary unit which comprises the receiving device for receiving said electromagnetic field. The primary unit and the secondary unit can e.g. each comprise a set of three-phase windings providing the aforementioned primary and secondary winding structure. A set of windings of the primary unit can be installed on the ground (primary windings) and can be fed by a wayside power converter (WPC). A set of windings of the secondary unit is installed on the vehicle. For example, the second set of windings can be attached underneath the vehicle, in the case of trams under some of its wagons. The set of windings of the primary unit can also be referred to as primary side, wherein the set of windings of the secondary unit can be referred to as secondary side. The first and the secondary side can be part of a high frequency transformer to transfer electric energy to the vehicle. This transfer can be done in a static state (when there is no movement of the vehicle) and in a dynamic state (when the vehicle moves).

U.S. Pat. No. 7,454,170 B2 discloses an inductive transmission system for inductive transmission of power and full duplex data signals between first and second devices. The transmission system includes a bi-directional inductive channel between the two devices, a transmitter for transmitting a power signal at a first frequency from the first device to the second device over the inductive channel, a first modulating device for modulating a first data signal at a first modulation frequency, and a second modulating device for modulating a second data signal at a second modulation frequency. Further, the transmitters transmit the modulated first data signals from the first device to the second device over the inductive channel and transmit the modulated second data signals from the second device to the first device over the inductive channel. The first modulation frequency and the second modulation frequency are at least a factor two apart.

Inductive power transfer usually requires a correct positioning of a vehicle-sided secondary winding structure relative to a primary winding structure in order to maximize the amount of transfer power but also in order to meet safety requirements and ensure an electromagnetic compatibility.

WO 2011/127455 A2 describes a wireless charging and wireless power alignment of wireless power antennas associated with a vehicle.

WO 2014/023595 A2 discloses a vehicle and an induction charging unit, wherein the induction charging unit comprises a primary coil and the vehicle comprises a secondary coil. Further, in the charging position, the secondary coil is located in a preferred spatial position range with respect to the primary coil with the result that, in order to set the charging position, the system determines, by means of an electromagnetic distance and angle measurement using triangulation, a location which describes a time-dependent spatial position of the secondary coil with respect to the primary coil. The system detects, by means of the location and the charging position, at least one partial driving direction along which the location of a charging position can be approached.

The documents disclose communication antennas of an inductive power transfer (IPT) unit, namely the primary unit or the secondary unit. These communication antennas, however, are designed as individual elements. Thus, an additional mounting space for such a communication antenna has to be provided within the IPT unit. If such mounting space is provided by a recess in the housing, a manufacturing process of the housing is complicated and a tightness of the housing may be negatively affected.

There is the technical problem to provide an inductive power transfer (IPT) unit, a system for inductive power transfer and a method of communication between a primary unit and a secondary unit, which allow a high quality communication between a primary unit and a secondary unit while building space requirements of an IPT unit are minimized.

SUMMARY OF THE INVENTION

It is a main idea of the invention to provide an antenna element for communication purposes, wherein a flux guiding means of an IPT unit provides a part of this antenna element. The antenna element can also be an element for positioning purposes.

An IPT unit is proposed. The IPT unit can either be a primary unit or a secondary unit of a system for inductive power transfer. The IPT unit can comprise a totality or a subset of components by which an alternating electromagnetic field for inductive power transfer is generated or received.

The IPT unit comprises at least one winding structure. In the case of a primary unit, the winding structure provides a primary winding structure which generates the alternating electromagnetic field for inductive power transfer if energized. In the case of a secondary unit, the winding structure provides a secondary winding structure which generates an alternating output voltage if receiving the alternating electromagnetic field generated by the primary winding structure.

Further, the IPT unit comprises at least one flux guiding means. The flux guiding means can denote at least one element for guiding a magnetic flux of the electromagnetic field which is generated or received by the winding structure. Preferably, the IPT unit comprises an arrangement of multiple flux guiding means or elements. The at least one flux guiding means can be arranged on a side facing away from an active volume of the winding structure. The active volume can denote the volume between the primary unit and the secondary unit during inductive power transfer. Such a pad can be installed on the surface of a route or a parking space or integrated within such a surface. The primary winding structure(s) generate an alternating (electro-) magnetic field if the primary winding structures are energized or supplied with operating currents. This electromagnetic field can be received by one or more secondary winding structure(s).

In the context of this invention, the following reference coordinate system can be used. A first axis, which can also be referred to as longitudinal axis, can extend parallel to a longitudinal axis of the winding structure, e.g. the aforementioned direction of extension. A second axis, which can also be referred to as lateral axis, can be oriented parallel to a lateral axis of the winding structure. A third axis, which can also be referred to as vertical axis, can be oriented perpendicular to the first and the second axes. The third axis can be oriented parallel to a desired direction of power transfer, i.e. from the primary unit to the secondary unit. The vertical axis can be oriented from bottom to top if pointing from the primary unit to the secondary unit.

A length can be measures along the first axis, a width can be measured along the second axis and a height can be measured along the third axis. Directional terms referring to a direction such as "above", "under", "ahead", "beside" can relate to the aforementioned longitudinal, lateral and vertical axes.

Referring to the vertical axis (and its direction), the at least one flux guiding means can be arranged above the secondary winding structure or at the same vertical level as the secondary winding structure. In the case of a primary winding structure, the at least one flux guiding means can be arranged under or at the same vertical level as the primary winding structure.

Each winding structure comprises at least one subwinding structure. A subwinding structure can be provided by at least one section of the winding structure. In particular, a subwinding structure can provide a loop or a coil, wherein the loop or coil is provided by at one or multiple section(s) of the winding structure.

The winding structures can extend along the longitudinal axis. Preferably, a winding structure comprises multiple subwinding structures which extend along the longitudinal axis. In this case, successive subwinding structures of the winding structure can be arranged adjacent to one another along said longitudinal axis. Adjacent to each other can mean that central axes of the subwindings, in particular the axes of symmetry, are spaced apart from another, e.g. with a predetermined distance along the longitudinal axis. A loop or coil can be circular-shaped, oval-shaped or rectangular-shaped. Of course, other geometrical shapes are also possible. The longitudinal axis of a primary winding structure can e.g. be parallel to a desired direction of travel of a vehicle driving above the primary winding structure into a charging position. The longitudinal axis of a secondary winding structure can e.g. be parallel to roll axis of a vehicle on which the secondary winding structure is installed.

Neighbouring or adjacent subwindings can be counter-oriented. This can mean that a current flow in a first subwinding is oriented clockwise, wherein the current flow in the neighbouring or adjacent second subwinding is counter-clockwise. The clockwise direction can be defined with respect to the parallel central axes which point into the same direction. If a current flows through the said subwindings, adjacent subwindings will generate a magnetic field of the same magnitude but oriented in opposite direction.

The winding structure can, in particular, be provided by flat subwinding structures, in particular flat loops or coils. This means that the winding structure is substantially arranged within a two-dimensional plane.

It is possible that the winding structure comprises at least one winding section which extends along the longitudinal axis and at least one winding section which extends along the lateral axis. The lateral axis can be oriented orthogonal to the longitudinal axis. The lateral and longitudinal axes can span the aforementioned plane in which the winding structure is substantially arranged. The longitudinal axis and the lateral axis can both be oriented perpendicular to the vertical axis.

The winding structure, in particular each subwinding structure, can thus be provided by sections extending substantially or completely parallel to the longitudinal axis and sections extending substantially or completely parallel to the lateral axis. In particular, each subwinding can be provided by two sections extending substantially or completely parallel to the longitudinal axis and two sections extending substantially or completely parallel to the lateral axis. The sections extending parallel to the lateral axis can also be referred to as active sections.

An arrangement of flux guiding means can comprise multiple rows of flux guiding elements. One row can comprise one or multiple flux guiding elements. The rows of flux guiding elements can be arranged adjacent to each other, in particular along the lateral axis. It is possible, that the rows abut or are spaced apart from another with a predetermined non-zero distance.

The arrangement of flux guiding means can be designed as a flux guiding layer. The layer can be arranged under and/or within the primary winding structure. Alternatively, the winding structure can be arranged above and/or within the secondary winding structure. A length of the layer can be larger or smaller than the length of the winding structure and a width of the layer can be larger or smaller than the width of the winding structure.

In one row of flux guiding elements, multiple elements can be arranged along or parallel to a straight line which is parallel to the longitudinal axis. These elements can abut or overlap at front end or rear end sections of the elements.

It is, for instance, possible, that two adjacent flux guiding elements in one row overlap each other. In particular, a front end section of a first flux guiding element can be arranged under or above a rear end section of the adjacent flux guiding element. In other words, the adjacent flux guiding elements can be arranged at different vertical positions.

Preferably, a row of multiple flux guiding elements can be designed such that a first subset of flux guiding elements is arranged at a first vertical position and a second set of flux guiding elements is arranged at a second vertical position, wherein the second vertical position is higher or lower than the first vertical position. Within the arrangement of flux guiding elements along the row, an alternating sequence of flux guiding elements from the first set and from the second set can be provided. In this configuration, a gap can be provided between two flux guiding elements of one of the sets, wherein this gap is covered or bordered by one flux guiding element of the other set. In other words, the arrangement or row of flux guiding elements can provide a recess to receive at least one section of the winding structure. In particular, the recess can be arranged and/or designed in order to receive a section of the winding structure extending along or parallel to the lateral axis. More particular, the recess can be designed and/or arranged such that a section of the winding structure at the transition from one subwinding structure to the successive subwinding structure along the longitudinal axis can be arranged within the recess.

Further, at least one section of the flux guiding element, the row of flux guiding elements or arrangement of flux guiding elements can extend into one subwinding structure of the winding structure. This can mean that the at least one section extends into a volume or area enclosed by the subwinding structure.

The flux guiding element can be made of a magnetic, in particular ferromagnetic, material. Preferably, the flux guiding means is made of ferrite.

Further, the inductive power transfer unit comprises at least one antenna element. The antenna element can be part of a communication unit of the power transfer unit. The communication unit can e.g. be a transmitter unit or a receiver unit, in particular for a unidirectional communication. The at least one antenna element is designed separate from the winding structure. This means that the antenna element is not provided by the winding structure. Further, the antenna element can be a receiving antenna element or a transmitting antenna element for a communication signal. The communication signal can in particular be a low-frequency signal. This can mean that the antenna element is designed such that a signal with a frequency from the range of 100 kHz to 400 kHz can be transmitted or received by said antenna element.

According to the invention, at least one portion of the at least one flux guiding means is or provides a part of the antenna element. In other words, at least a part of the antenna element can be integrated into or onto the at least one flux guiding means. In particular, the antenna element can be a so-called ferrite rod antenna, wherein an antenna winding structure is arranged on a ferrite element. In this case, the ferrite element of the ferrite rod antenna corresponds to or is equal to at least a part of the at least one flux guiding means. Generally, the antenna element can be a so-called magnetic rod antenna, wherein an antenna winding structure is arranged on a rod of magnetic material. This magnetic material can be part of the at least one flux guiding means.

This advantageously allows decreasing building space requirements for providing the antenna element for communication purposes. In particular, no additional mounting space and/or complicated change of design of the inductive power transfer unit has to be done.

In another embodiment, the flux guiding means is designed as a bar. In the context of this invention, a bar can denote an elongated element. The bar can have a desired shape, e.g. a cylindrical shape or the shape of a plate. Multiple flux guiding means, in particular of a row or an arrangement of flux guiding means can be mechanically fixed to one another.

E.g., these flux guiding means can be glued to each other. Further, these flux guiding means can be arranged in a layered arrangement.

The antenna element can be part of a positioning system which will be explained later.

In another embodiment, the antenna element is wound around at least one section of the flux guiding means. In particular, the antenna element can comprise one antenna winding structure, e.g. a coil, which is wound around at least one section of the flux guiding means, e.g. one section of a ferrite bar.

This advantageously allows providing a magnetic bar antenna by using existing flux guiding means of the inductive power transfer unit.

In another embodiment, the antenna element is wound around at least one section of multiple flux guiding means. This means that the magnetic element of the magnetic rod antenna is provided by sections of separate flux guiding means. This advantageously allows to provide a desired magnetic element of the antenna with the existing layout of multiple flux guiding means.

In another embodiment, at least one part of the antenna element is arranged within an area enclosed by the winding structure in a common plane of projection. The common plane of projection can be oriented orthogonal to the vertical axis. This can mean that the antenna element is arranged under or above or within an area or volume enclosed by the winding structure.

The area enclosed by the winding structure can in particular be an area enclosed by a subwinding of this winding structure. If at least one part of the antenna element is arranged under and/or within said area, the winding structure can be a primary winding structure. Alternatively, if the winding structure is a secondary winding structure, at least one part of the antenna element can be arranged above an area and/or within an area enclosed by the winding structure.

Alternatively or in addition, at least one part of the antenna element is arranged outside an area enclosed by the winding structure in the common plane of projection. If the winding structure is a primary winding structure, at least one part of the antenna element can be arranged under the area outside the area enclosed by the winding structure in the common plane of projection. If the winding structure is a secondary winding structure, at least one part of the antenna element can be arranged above the area outside the area enclosed by the winding structure in the common plane of projection. The area outside the enclosed area can e.g. be an area of an interspace between two adjacent subwindings of the winding structure along the longitudinal axis. The antenna element can also be arranged within the interspace area.

In other words, at least one part of the antenna element can be arranged at the same vertical position as the winding structure. Alternatively or in addition at least one part of the antenna element can be arranged above or under sections of the winding structure, in particular under or above sections of the winding structure extending along or parallel to the lateral axis.

It is possible that the complete antenna element is arranged under or above the area and/or within the area enclosed by the winding structure. Alternatively, it is possible that the complete antenna element is arranged within or outside the enclosed area in the common plane of projection.

It is, however, also possible that at least one section of one antenna element is arranged under or above and/or within the enclosed area, while another section is arranged under or above the area outside the enclosed area in the common plane of projection.

This advantageously provides means to have a wider range of inductances for the antenna element. This advantageously provides more flexibility in the antenna design, in particular when using a ferrite structure with different height levels.

In another embodiment, the antenna element provides a low-frequency antenna. In this case, the antenna element can be arranged and/or designed such that desired transmitting characteristics and/or receiving characteristics are provided for a frequency interval of 100 kHz to 400 kHz.

In another embodiment, the antenna element provides a transmitter for a unidirectional communication. This can mean that the antenna element is designed and/or arranged such that desired transmitting characteristics are provided. Alternatively, the antenna element provides a receiver for the unidirectional communication. This can mean that the antenna element has desired characteristics for receiving a signal. Thus, the antenna element can be part of a transmitter unit or a receiver unit for unidirectional communication.

This advantageously allows transmitting or receiving a signal to/from another unit of the inductive power transfer system.

In another embodiment, the inductive power transfer unit is a secondary unit of a system for inductive power transfer. In this case, the inductive power transfer unit can comprise three antenna elements. These antenna elements can be designed as receivers. In particular, three antenna elements can be arranged at different positions and/or with different orientations in a secondary-sided coordinate system.

Alternatively, the inductive power transfer unit can comprise a single antenna element. The single antenna element can be designed or provide a transmitter.

In an alternative embodiment, the inductive power transfer unit is a primary unit of a system for inductive power transfer. In this case, the inductive power transfer unit can comprise two antenna elements. These antenna elements can either be designed or provide transmitters or receivers. The antenna elements can be arranged at different positions and/or with different orientations in a primary-sided coordinate system.

Using two or more antenna elements, in particular antenna elements which are arranged at different positions and/or with different orientations, advantageously increases the flexibility for the determination of the relative position. The further apart the two antennas are placed, the higher can be the precision of the position determination.

In another embodiment, the inductive power transfer unit further comprises at least one communication unit for a bidirectional communication. The communication unit for the bidirectional communication can e.g. be designed as a unit for transmitting and/or receiving an ultrahigh frequency signal, e.g. a signal with a frequency from an interval of 2.4 GHz to 5 GHz. The communication unit can comprise at least one antenna element which is different from the antenna element which integrates the flux guiding means.

This advantageously allows a bidirectional communication between separate units of a system for inductive power transfer.

In particular, the antenna elements can be part of a system for detecting a correct position and/or orientation of a secondary winding structure relative to a primary winding structure.

In this case, the communication unit for the bidirectional communication allows exchanging further information between the units.

In another embodiment, the inductive power transfer unit further comprises at least one control unit for operating the at least one antenna element. In the case that the antenna element is a transmitter, the control unit can provide a signal, in particular a voltage signal, by which the at least one antenna element is energized. In the case that the at least one antenna element is a receiver, the control unit can evaluate an output signal, e.g. an output voltage, of the antenna element. The control unit can e.g. also control an operation of the communication unit for bidirectional communication.

Further, the control unit can determine a position and/or orientation of secondary winding structure relative to a primary winding structure depending on an output signal of at least one receiver antenna element, preferably depending on output signals of multiple receiver antenna elements.

This advantageously allows a primary-sided or secondary-sided operation of the at least one antenna element. Further, this advantageously allows a primary-sided or secondary-sided determination of correct position and/or orientation.

In another embodiment, the inductive power transfer unit comprises a compensating element for compensating a voltage which is induced in the antenna element by the electromagnetic field for inductive power transfer at least partially. The compensating element can e.g. be provided by a compensating winding structure. The compensating winding structure can be arranged and/or designed such that a voltage induced in the compensating winding structure equals to the voltage induced within the antenna element but has a different sign. In this case, the compensating winding structure can be connected in series to a winding structure of the antenna element.

It is possible that the compensating winding structure is arranged under the at least one flux guiding means if the winding structure is a primary winding structure. If the winding structure is a secondary winding structure, the compensating winding structure can be arranged above the at least one flux guiding means.

Further proposed is a system for inductive power transfer. The system comprises a primary unit and a secondary unit. The primary unit can be designed according to the embodiments of an inductive power transfer unit described in this invention. Alternatively or in addition, the secondary unit can be designed according to the embodiments of an inductive power transfer unit described in this invention.

Preferably, both, the primary unit and the secondary unit comprise an antenna element, wherein at least one flux guiding means of the respective unit is part of the respective antenna element.

In a preferred embodiment, the primary unit comprises two antenna elements and the secondary unit comprises three antenna elements wherein at least one of these antenna elements integrates at least one portion of the at least one flux guiding means. In this case, the antenna elements of the primary unit can provide transmitters, wherein the antenna elements of the secondary unit can comprise receivers. Further, the signals transmitted by the primary-sided antenna elements can be received by the secondary-sided antenna elements. A position and/or orientation of the primary winding structure relative to the secondary winding structure can be determined based on the received signals, e.g. by a secondary-sided control unit.

In an alternative embodiment, the secondary unit comprises one antenna element and the primary unit comprises two antenna elements. In this case, the secondary-sided antenna element can be a transmitter, wherein the primary-sided antenna elements can be receivers.

This advantageously allows a detection of a correct position and/or orientation of the primary winding structure relative to the secondary winding structure with a minimal number of antenna elements.

Further proposed is a method of communication between a primary unit and a secondary unit of a system for inductive power transfer. The primary unit and/or the secondary unit is/are designed according to one of the embodiments of an inductive power transfer unit described in this invention. One of the units transmits a signal to the remaining unit by the at least one antenna element.

Alternatively or in addition, one of the units receives a signal of the remaining unit by the at least one antenna element.

It is for instance possible that the primary unit transmits a signal by the at least one antenna element, wherein the secondary unit receives said signal by the at least one antenna element. It is also possible that the primary unit comprises two antenna elements, wherein both antenna elements transmit a signal. It is further possible that the secondary unit comprises more than one, e.g. three antenna elements, wherein the antenna elements receive the transmitted signal(s).

Preferably, the secondary unit transmits a signal by the at least one antenna element, preferably by exactly one antenna element. Further, the primary unit receives the said signal by the at least one antenna element, e.g. by two antenna elements of the primary unit.

As will be explained later, a correct position and/or orientation of the primary winding structure relative to the secondary winding structure can be determined depending on the transmitted and/or received signal.

In another embodiment, a correct position and/or orientation of a secondary winding structure relative to a primary winding structure is determined depending on the transmitted signal(s) and/or received signal(s). It is, for instance, possible that a position and/or orientation of the secondary winding structure relative to the primary winding structure is determined in terms of a distance between the secondary winding structure and the primary winding structure and an angle between longitudinal axes of the primary winding structure and the secondary winding structure.

It is possible that a position and/or orientation of a primary-sided antenna element relative to the primary winding structure is known, e.g. by measurements. Further, a position and/or an orientation of a secondary-sided antenna element relative to the secondary winding structure can be known. In this case, the relative position and/or orientation can also be determined depending on the known geometric arrangement of antenna elements relative to the respective winding structures.

It is further possible that at least one signal characteristic of the received signal(s) is determined e.g. by a control unit. Further, the signal transmitted by the at least one antenna element can be generated with a constant signal strength. This signal strength can be a predetermined strength.

It is for instance possible that at least one secondary-sided antenna element receives a signal transmitted by at least one primary-sided antenna element. Preferably, multiple, e.g. three secondary-sided antenna elements receive at least one, preferably multiple, e.g. two signals transmitted by different primary-sided antenna elements. Further, a signal strength of the received signals can be determined. Depending on the signal strength of the received signals, a relative position and orientation of the secondary winding structure to the primary winding structure can be determined. For the determination, the constant signal strength can be provided to the secondary-sided control unit. This information can e.g. be provided by the communication unit for bidirectional communication.

In another embodiment, the position and/or orientation of the secondary winding structure relative to the primary winding structure is determined depending on the signal strength of the received signal(s). In particular, the position and/or orientation of the secondary winding structure can be determined depending on a carrier signal level of the received signal(s). It is, for instance, possible to transmit data from the secondary unit to the primary unit by modulating a carrier signal in order to encode information. Thus, a transmitted signal can be provided by a carrier signal modulated with a data signal. In particular, a data signal can be modulated onto the carrier signal by a phase modulation. The carrier signal can e.g. have a frequency of 405 kHz.

Evaluating the signal strength advantageously allows a simple but accurate determination of the relative position and/or orientation.

It is further possible to determine a correct or incorrect position and/or orientation of the secondary winding structure relative to the primary winding structure depending on the transmitted signal(s) and/or received signal(s). It is, for instance, possible that a signal is transmitted by one transmitter antenna element, e.g. a secondary-sided or a primary-sided antenna element. Further, the transmitter signal can be received by two or more receiver antenna elements of the remaining inductive power transfer unit. These two or more receiver elements can be arranged at different positions and/or with different orientations. Depending on the signal strength of the received signals, it can be determined if a correct position and/or orientation of the secondary winding structure relative to the primary winding structure is provided, e.g. if an aligned state is provided. An correct position and/or orientation can e.g. be provided if all signal strength are higher than a predetermined general threshold value or if each signal strength is higher than an antenna element-specific threshold value. An incorrect position and/or orientation, e.g. a misaligned state, can be determined if at least one signal strength is lower than the general or the antenna element-specific threshold value.

In another embodiment, a voltage induced in the at least one antenna element by the electromagnetic field for power transfer is compensated at least partially. The compensation can be provided by at least one compensating element which has been described previously. This advantageously allows minimizing effects of the electromagnetic field for power transfer on the at least one antenna element.

BRIEF DESCRIPTION OF THE DRAWINGS

The invention will be described with reference to the attached figures. The figures show.

DESCRIPTION OF THE INVENTION

Figure 1:
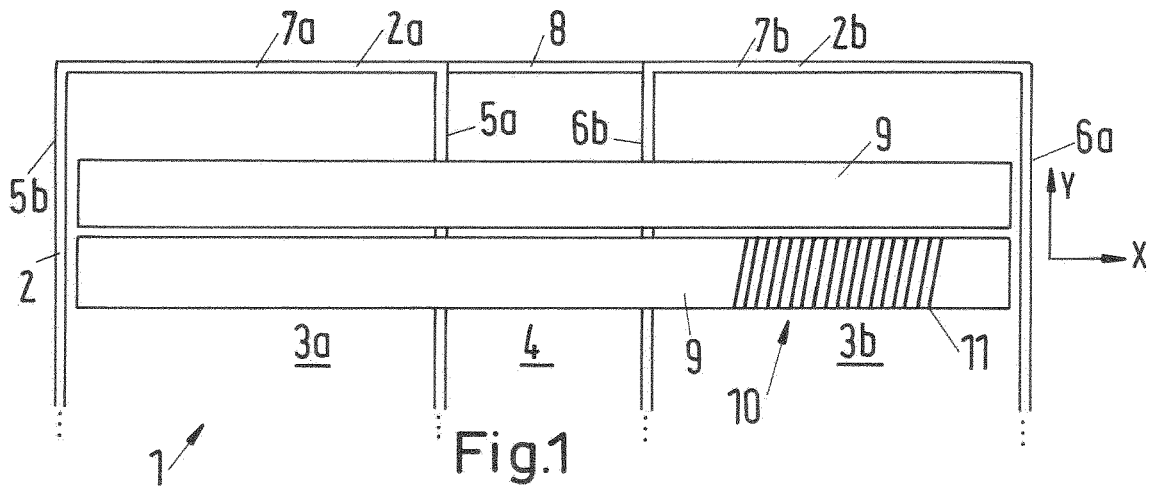
FIG. 1 a schematic top view on an inductive power transfer unit according to the invention, FIG. 2 a schematic side view of the inductive power transfer unit shown in FIG. 1, FIG. 3 a schematic top view of an inductive power transfer unit according to another embodiment, FIG. 4 a schematic side view of the inductive power transfer unit shown in FIG. 3, FIG. 5 a schematic top view of an inductive power transfer unit according to another embodiment, FIG. 6 a schematic side view of the inductive power transfer unit shown in FIG. 5, FIG. 7 a schematic top view on an inductive power transfer unit according to another embodiment of the invention, FIG. 8 a schematic side view of the inductive power transfer unit shown in FIG. 7.

In the following, the same reference numerals denote elements with the same or similar technical features.

FIG. 1 shows a schematic top view on an inductive power transfer unit 1. The inductive power transfer unit 1 comprises a winding structure 2, wherein the winding structure 2 comprises a first subwinding 2a and a second subwinding 2b. The winding structure 2 extends along a longitudinal axis x.

It is shown that the first subwinding 2a provides a rectangular-shaped loop. Also the second subwinding 2b provides a rectangular-shaped loop. The first subwinding 2a encloses an inner area 3a. The second subwinding 2b encloses an inner area 3b. Between the two subwindings 2a, 2b, an interspace area 4 is provided. The interspace area 4 is arranged between a front end section 5a of the first subwinding and a rear end section 6b of the second subwinding. Further indicated are a front end section 6a of the second subwinding and a rear end section 5b of the first subwinding 2a. The front and rear end sections 5a, 5b, 6a, 6b extend parallel to a lateral axis y. Further shown are longitudinal sections 7a, 7b. An electrical connection of the two subwindings 2a, 2b is schematically shown by a longitudinal section 8 connecting the first subwinding 2a and the second subwinding 2b. A section of the winding structure 2 can be provided by a lithe wire or a conductor.

Further, the inductive power transfer unit 1 comprises multiple ferrite bars 9, wherein the ferrite bars 9 extend along the longitudinal direction x. Shown are two ferrite bars 9 which are arranged adjacent to each other along the lateral direction y, wherein the adjacent ferrite bars 9 are spaced apart from another with a non-zero distance. One ferrite bar 9 provides one row. The ferrite bars 9 are designed as ferrite plates.

Further, with respect to a vertical direction z (see FIG. 2) a ferrite bar 9 is arranged above the winding structure 2. In particular, the ferrite bar 9 is arranged above the area 3a enclosed by the first subwinding 2a, the interspace area 4 and the inner area 3b enclosed by the second subwinding 2b. It is shown that the ferrite bar 9 has a length along the longitudinal axis x which is smaller than the length of the winding structure 2.

Further shown is an antenna element 10, wherein a winding structure 11 of the antenna element 10 is wound around one section of one of the ferrite bars 9. In particular, the winding structure 11 is wound around a section of the ferrite bar 9 which is located above the inner area 3b enclosed by the second subwinding structure 2b.

Figure 2:
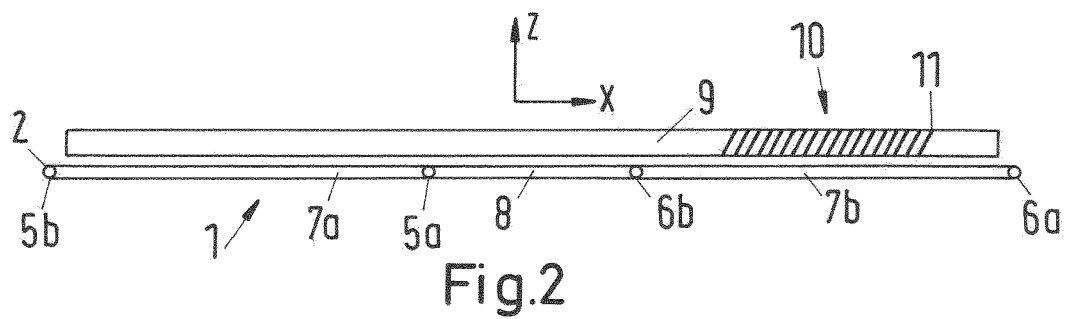

FIG. 2 shows a schematic side view of the inductive power transfer unit 1 shown in FIG. 1. It can be seen that the complete ferrite bar 9 is arranged above the winding structure 2. Further, the inductive power transfer unit 1 can in particular be a secondary unit of a system for inductive power transfer 12 (see FIG. 9).

Figure 3:
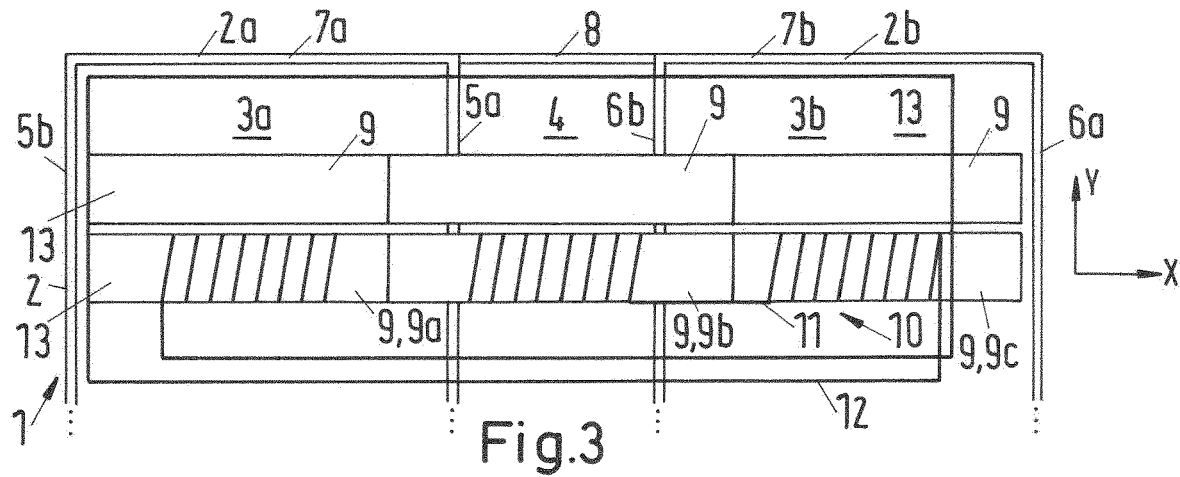

FIG. 3 shows a schematic top view on an inductive power transfer unit 1 according to another embodiment of the invention. The inductive power transfer unit 1 shown in FIG. 3 is designed similar to the inductive power transfer unit 1 shown in FIG. 1 and FIG. 2. In contrast to the embodiment shown in FIG. 1 and FIG. 2, the inductive power transfer unit 1 comprises a compensating winding structure 12. The compensating winding structure 12 has a rectangular shape, wherein terminal or end sections of the compensating winding structure 12 are connected to terminal or end sections of the winding structure 11 of the antenna element 10. An area 13 enclosed by the compensating winding structure 12 is arranged above the inner area 3a enclosed by the first subwinding 2a, above the interspace area 4 and the inner area 3b enclosed by the second subwinding 2b. It is shown that the area 13 is arranged above a portion of the inner area 3a enclosed by the first subwinding 2a which is larger than the portion of the inner area 3b covered by the compensating winding structure 12. As a result, the compensating winding structure 12 is arranged and designed such that the electromagnetic field for inductive power transfer which is generated or received by the winding structure 2 induces a voltage in the compensating winding structure 12 which is equal to the voltage induced in the winding structure 11 of the antenna element 10 or differs not more than a predetermined amount from said voltage.

Another differing feature to the embodiment shown in FIG. 1 and FIG. 2 is that the winding structure 11 of the antenna element is wound around multiple ferrite bars 9 of a row 13 of ferrite bars 9, wherein the row 13 comprises three ferrite bars 9. A first section of the winding structure 11 is wound around a section of a first ferrite bar 9a which is arranged above the inner area 3a enclosed by the first subwinding 2a. A second section of the winding structure 11 of the antenna element 10 is wound around a section of a second ferrite bar 9b which is arranged above the interspace 4. Finally, a third section of the winding structure 11 of the antenna element 10 is wound around a section of a third ferrite bar 9c which is arranged above the inner area 3b enclosed by the second subwinding 2b.

Figure 4:
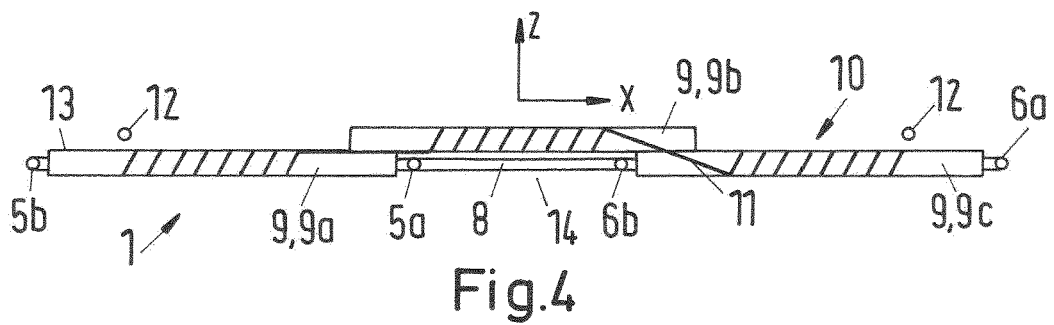

FIG. 4 shows a schematic side view of the inductive power transfer unit 1 shown in FIG. 3. Shown is a row 13 of three ferrite bars 9. With respect to the vertical direction z, a first ferrite bar 9a and a third ferrite bar 9c are arranged at a lower position than a second ferrite bar 9b. A rear end section of the second ferrite bar 9b is arranged above a front end section of the first ferrite bar 9a. Further, a rear end section of the third ferrite bar 9c is arranged under a front end section of the second ferrite bar 9b. Thus, the second ferrite bar 9b overlaps the first and the third ferrite bar 9a, 9c partially. In summary, a recess 14 is provided by the row 13 of ferrite bars 9a, 9b, 9c. Within the recess 14, the front section 5a and the rear section 6b of the first and second subwinding 2a, 2b are arranged.

Further shown is that the first ferrite bar 9a is arranged within the inner area 3a enclosed by the first subwinding 2a. As the first section of the winding structure 11 of the antenna element is wound around the first ferrite bar 9a, it is also arranged in inner area 3a of the first subwinding 2a. Correspondingly, the third ferrite bar 9c is arranged in the inner area 3b of the second subwinding 2b. As a result, the third section of the winding structure 11 of the antenna element 10 is also arranged in the inner area 3b of the second subwinding 2b. The second ferrite bar 9b is arranged above the interspace area 4. Thus, a second section of the winding structure 11 of the antenna element 10 is also arranged above the interspace area 4.

Figure 5:
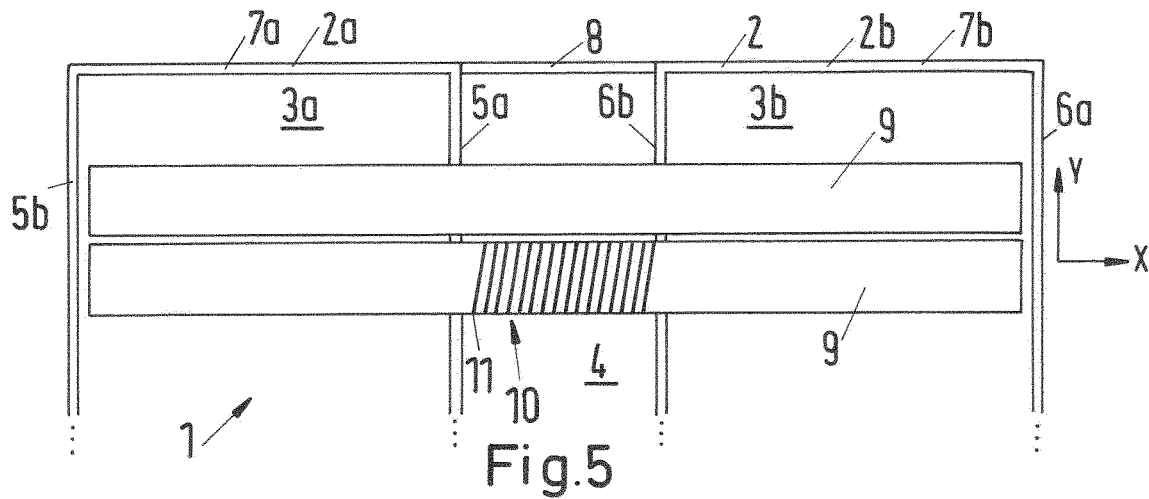
Figure 6:
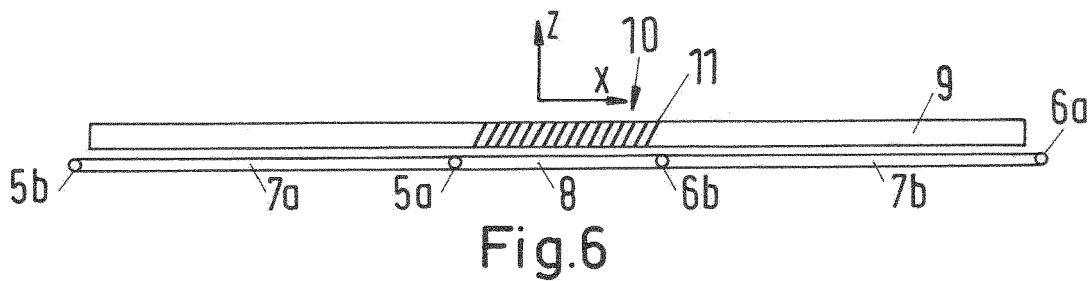

FIG. 5 and FIG. 6 show a schematic top and side view on an inductive power transfer unit 1 according to another embodiment of the invention. The inductive power transfer unit 1 shown in FIG. 5 is designed similar to the embodiments shown in FIG. 1 and FIG. 2. In contrast to the embodiments shown in FIG. 1 and FIG. 2, the winding structure 11 of the antenna element 10 is completely arranged above the interspace area 4.

Figure 7:
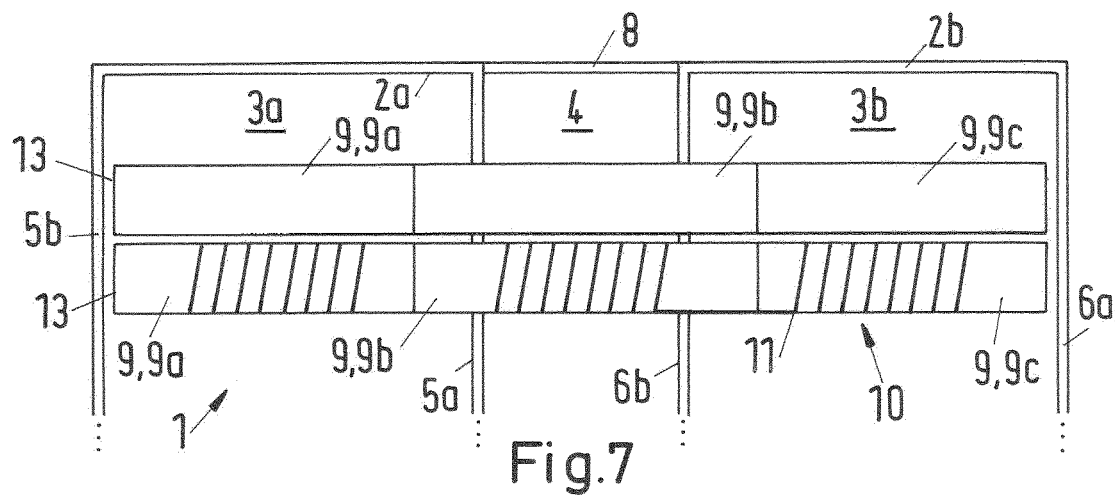
Figure 8:
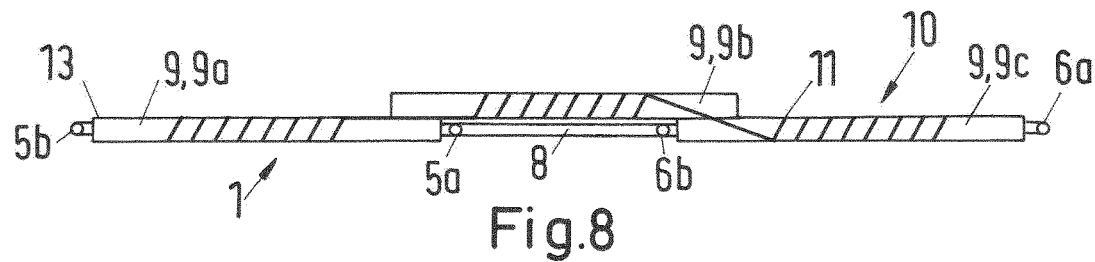

FIG. 7 and FIG. 8 show a schematic top view and a schematic side view of an inductive power transfer unit 1 in another embodiment of the invention. The inductive power transfer unit 1 shown in FIG. 7 and FIG. 8 are designed similar to the embodiment shown in FIG. 3 and FIG. 4. In contrast to the embodiment shown in FIG. 3 and FIG. 4, the inductive power transfer unit 1 has no compensating winding structure 12.

However, different sections of the winding structure 11 of the antenna element 10 are wound around different ferrite bars 9a, 9b, 9c of a row 13 of ferrite bars 9a, 9b, 9c.

Figure 9:
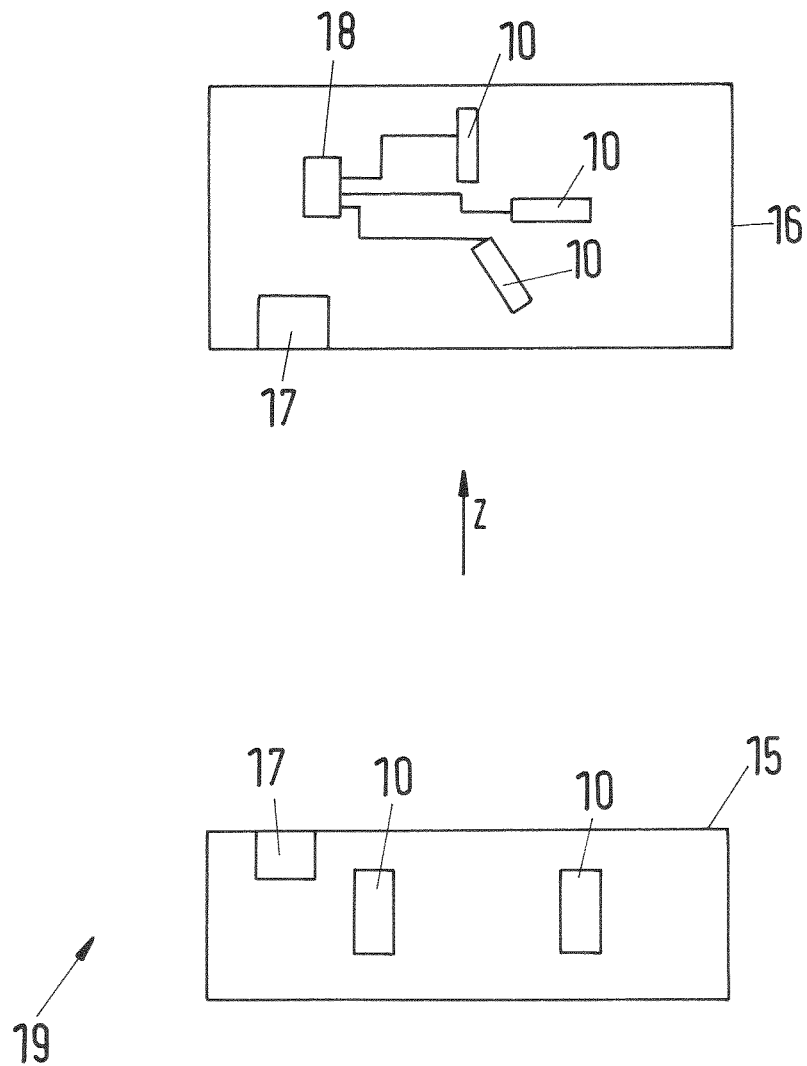
FIG. 9 a schematic block diagram of a system for inductive power transfer according to the invention.

FIG. 9 shows a schematic block diagram of a system 12 for inductive power transfer. The system 14 comprises a primary unit 15 and a secondary unit 16. The primary unit 15 can be installed in or on a ground, in particular on a surface of a route. Thus, the primary unit 15 can also be referred to as wayside unit. The secondary unit 16 can be installed on a vehicle.

The primary unit 15 comprises two antenna elements 10 which are arranged at different positions. Further, the primary unit 15 comprises a communication unit 17 for an ultrahigh frequency bidirectional communication. Not shown are a primary winding structure and other elements of the primary unit 15.

The secondary unit 16 comprises three antenna elements 10 and a bidirectional UHF communication unit 17.

A position of the primary-sided antenna elements 10 relative to a primary winding structure is known. Further known is a position and orientation of the secondary-sided antenna elements 10 relative to the secondary winding structure.

To determine if the secondary winding structure is correctly aligned relative to the primary winding structure, the primary-sided antenna elements can transmit a signal with a constant signal strength. This means that the primary-sided antenna elements can be operated with a constant transmitting power. The constant signal strength can be communicated to the secondary unit 16 via the primary-sided communication unit 17 of the primary unit 15.

The three secondary-sided antenna elements 10 receive the signals transmitted by the primary-sided antenna elements 10. A control unit 18 of the secondary unit 16 evaluates a signal strength of the received signal. Depending on the constant signal strength of the transmitted signal, a geometric arrangement of the three secondary-sided antenna elements 10, a distance of the primary winding structure to the secondary winding structure along a vertical direction z can be determined. Further, an orientation of a longitudinal axis x of the primary winding structure relative to a longitudinal axis x of the secondary winding structure can be determined. If the distance is within a predetermined distance interval and the orientation, e.g. in form of an angle, is within a predetermined orientation interval, a correct position and orientation of the secondary winding structure relative to the primary winding structure can be determined. This information can be used in order to enable an inductive power transfer.

The invention claimed is:

1. An inductive power transfer unit for inductive power transfer to a vehicle, wherein the inductive power transfer unit comprises at least one winding structure and at least one flux guiding means, wherein the inductive power transfer unit further comprises at least one antenna element, wherein at least one portion of the at least one flux guiding means is a part of the at least one antenna element,
wherein the inductive power transfer unit comprises an arrangement of multiple flux guiding means, wherein the arrangement of flux guiding means comprises multiple rows of flux guiding elements, wherein the rows of flux guiding elements are arranged adjacent to each other, wherein a flux guiding means is designed as a bar, wherein the at least one antenna element is wound around at least one section of at least one flux guiding means,
wherein the at least one winding structure comprises multiple subwinding structures,
wherein successive subwinding structures of the at least one winding structure are arranged adjacent to one another along a longitudinal axis of the at least one winding structure,
wherein the at least one winding structure is configured to generate or receive an electromagnetic field for the inductive power transfer,
wherein the at least one flux guiding means is configured to guide a magnetic flux of the electromagnetic field generated or received by the at least one winding structure,
wherein at least one section of the flux guiding means extends into a volume or area enclosed by the multiple subwinding structures, and
wherein the at least one antenna element is configured to separate from the at least one winding structure and is an element for receiving or transmitting a communication signal.

2. The inductive power transfer unit of claim 1, wherein the at least one antenna element is wound around at least one section of multiple flux guiding means.

3. The inductive power transfer unit of claim 1, wherein at least one part of the at least one antenna element is arranged within an area enclosed by the at least one winding structure in a common plane of projection and/or at least one part of the at least one antenna element is arranged outside an area enclosed by the at least one winding structure in a common plane of projection.

4. The inductive power transfer unit of claim 1, wherein the at least one antenna element provides a low-frequency antenna.

5. The inductive power transfer unit of claim 1, wherein the at least one antenna element provides a transmitter or a receiver for a unidirectional communication.

6. The inductive power transfer unit of claim 1, wherein the inductive power transfer unit is a secondary unit of a system for inductive power transfer.

7. The inductive power transfer unit of claim 1, wherein the inductive power transfer unit is a primary unit of a system for inductive power transfer.

8. The inductive power transfer unit of claim 1, wherein the inductive power transfer unit further comprises at least one communication unit for a bidirectional communication.

9. The inductive power transfer unit of claim 1, wherein the inductive power transfer unit further comprises at least one control unit for operating the at least one antenna element.

10. The inductive power transfer unit of claim 1, wherein the inductive power transfer unit further comprises a compensating element for at least partially compensating a voltage which is induced in the at least one antenna element by the electromagnetic field for inductive power transfer.

11. A system for inductive power transfer, wherein the system comprises a primary unit and a secondary unit, wherein at least one of the primary unit and the secondary unit is designed according to claim 1.

12. The system according to claim 11, wherein the primary unit comprises two antenna elements and the secondary unit comprises three antenna elements.

13. The system according to claim 11, wherein the secondary unit comprises one antenna element and the primary unit comprises two antenna elements.

14. A method of communication between a primary unit and a secondary unit of a system for inductive power transfer, wherein at least one of the primary unit and the secondary unit is designed according to claim 1, wherein one of the primary and secondary units at least one of transmits a signal to and receives a signal from the other of the primary and secondary units by the at least one antenna element.

15. The method of claim 14, wherein at least one of a position and an orientation of a secondary winding structure relative to a primary winding structure is determined depending on at least one of the transmitted signal and the received signal.

16. The method of claim 15, wherein at least one of the position and the orientation of the secondary winding structure relative to the primary winding structure is determined depending on a signal strength of the received signal.

17. The method of claim 14, wherein a voltage induced in the at least one antenna element by the electromagnetic field for power transfer is compensated at least partially.

\* \* \* \* \*